United States Patent [19]

Black et al.

[11] 3,881,015

[45] Apr. 29, 1975

[54] PHARMACEUTICAL COMPOSITIONS AND METHODS OF INHIBITING HISTAMINE ACTIVITY WITH ISOTHIOUREA COMPOUNDS

[75] Inventors: James Whyte Black, Hemel Hempstead; Graham John Durant, Welwyn Garden City; John Colin Emmett, Kimpton; Charon Robin Ganellin, Welwyn Garden City, all of England

[73] Assignee: Smith Kline & French Laboratories Limited, Hartfordshire, England

[22] Filed: June 13, 1974

[21] Appl. No.: 478,999

Related U.S. Application Data

[63] Continuation of Ser. No. 330,548, Feb. 8, 1973, abandoned, which is a continuation-in-part of Ser. No. 80,819, Oct. 14, 1970, Pat. No. 3,736,331.

[52] U.S. Cl. ............... 424/273; 424/250; 424/263; 424/269; 424/270
[51] Int. Cl. ............................................ A61k 27/00
[58] Field of Search ........... 424/269, 250, 263, 270, 424/273

[56] References Cited
UNITED STATES PATENTS
3,558,640   1/1971   Sheh et al. ........................ 260/309

FOREIGN PATENTS OR APPLICATIONS
1,069,117   5/1967   United Kingdom ................ 260/309

OTHER PUBLICATIONS
Chemical Abstracts 70, 77726u (1969).
Chemical Abstracts 70, 76170w (1969).
Chemical Abstracts 70, 76171x (1969).

*Primary Examiner*—Albert T. Meyers
*Assistant Examiner*—Norman A. Drezin
*Attorney, Agent, or Firm*—Joan S. Keps; Richard D. Foggio; William H. Edgerton

[57] ABSTRACT

Pharmaceutical compositions and methods of inhibiting histamine activity with N-(heterocyclic-alkyl)isothioureas.

11 Claims, No Drawings

PHARMACEUTICAL COMPOSITIONS AND METHODS OF INHIBITING HISTAMINE ACTIVITY WITH ISOTHIOUREA COMPOUNDS

This is a continuation of application Ser. No. 330,548 filed Feb. 8, 1973, now abandoned, which is a continuation-in-part of Ser. No. 80,819 filed Oct. 14, 1970, now U.S. Pat. No. 3,736,331.

This invention relates to pharmaceutical compositions and methods of inhibiting histamine activity, and more particularly inhibiting H-2 histamine receptors, with isothiourea compounds. The isothiourea compounds normally exist as the addition salts but, for convenience, reference will be made throughout this specification to the parent compounds.

It has for long been postulated that many of the physiologically active substances within the animal body, in the course of their activity, combine with certain specific sites known as receptors. Histamine is a compound which is believed to act in such a way but, since the actions of histamine fall into more than one type, it is believed that there is more than one type of histamine receptor. The type of action of histamine which is blocked by drugs commonly called "antihistamines" (of which mepyramine is a typical example) is believed to involve a receptor which has been designated by Ash and Schild (Brit. J. Pharmac. Chemother. 27:427, 1966) as H-1. The isothiourea compounds of the pharmaceutical compositions and methods of the present invention are distinguished by the fact that they act at histamine receptors other than the H-1 receptor, that is they act at H-2 histamine receptors which are described by Black et al., Nature 236, 385 (1972). Black et al., cited above, page 390, column 2, state the following: "Mepyramine has been defined as an $H_1$-receptor antagonist[1] and burimamide has now been defined as an $H_2$-receptor antagonist. Used alone, burimamide can antagonize those responses to histamine, such as stimulation of acid gastric secretion, which cannot be blocked by mepyramine; histamine apparently activates $H_2$-receptors to produce these effects." Thus, from the Black et al. paper, H-2 histamine receptors are those histamine receptors which are not inhibited by mepyramine but are inhibited by burimamide. Thus they are of utility in inhibiting certain actions of histamine which are not inhibited by the above-mentioned "antihistamines." Inhibitors of H-2 histamine receptors are useful, for example, as inhibitors of gastric acid secretion and as anti-inflammatory agents particularly where the inflammation is kinin-mediated.

The isothiourea compounds which are the active ingredients of the pharmaceutical compositions and are used in the methods of inhibiting H-2 histamine receptors according to this invention are represented by the following formula in which it is understood that the structure of the nucleus is such that the bond between the carbon and nitrogen atoms might equally well be represented as a double bond:

FORMULA I

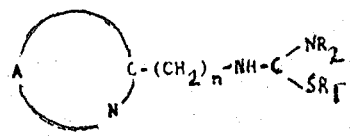

in which:

$n$ is 2 to 5;

A is a chain of 3 to 4 carbon atoms of which 1 to 2 are nitrogen or 1 is sulfur in the position alpha to the carbon atom and the remainder are carbon, which chain forms an unsaturated ring with the carbon and nitrogen atoms to which it is attached;

$R_1$ is an alkyl group having 1 to 6 carbon atoms, an alkenyl or alkynyl group having 2 to 6 carbon atoms or $(CH_2)_mZ$ where m is 1 to 3 and Z is phenyl optionally monosubstituted by halogen, hydroxy or nitro; hydroxy; di-lower alkylamino; cyano; carboxy; phenoxy; benzhydryloxy or imidazolyl and $R_2$ is hydrogen, alkyl having 1 to 4 carbon atoms, phenyl or benzyl or $R_1$ and $R_2$ together with the carbon atoms to which they are attached may form a thiazoline or thiazolin-4-one ring and pharmaceutically acceptable acid addition salts thereof.

The ring formed by A and the carbon and nitrogen atoms shown may be, for example, imidazolyl, pyridyl, 1,2,4-triazolyl, pyrazolyl or thiazolyl.

Most preferably A is such that it forms with the carbon and nitrogen atoms shown a 4(5)-imidazolyl ring.

Specific compounds which fall with the above classes of novel compounds and are particularly useful include N-3-(4(5)-imidazolyl)propyl-S-ethylisothiourea, N-3-(4(5)-imidazolyl)propyl-S-(2-phenylethyl)isothiourea, N-3-(4(5)-imidazolyl)propyl-S-propargylisothiourea, and N-4-(4(5)-imidazolyl)butyl-S-methylisothiourea.

Suitable starting materials which may be used for the synthesis of the isothioureas of Formula I are the compounds represented by the following Formula II:

FORMULA II

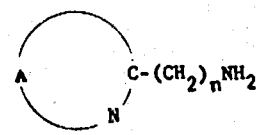

in which n and A have the same significance as in Formula I. Of the preferred compounds wherein A is such that a 4(5)-imidazolyl ring is formed, histamine (n-2) is of course well known and readily available; the compound where n-3 may be synthesized from 4(5)-2-chloroethylimidazole as described in Example 1 hereinafter; the synthesis of the compound wherein n-4 has been described and the compound wherein n-5 is synthesized from ε-aminocaproic acid.

Reaction of amines of Formula II with an isothiocyanate of the formula $R_3NCS$ wherein $R_3$ is an alkyl group containing from one to four carbon atoms, phenyl, benzyl leads to compounds of Formula III:

FORMULA III

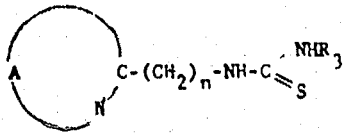

The compounds of Formula III may also be formed, in certain cases, from the amines of Formula II by treatment of the latter with carbon disulphide to form the dithiocarbamic acid, the alkyl ester of which is then treated with $R_3NH_2$.

In the case where $R_3$ in the compound of Formula III is benzoyl, hydrolysis leads to the corresponding compounds wherein $R_3$ is hydrogen, which compounds may alternatively be formed directly from the amines of Formula II be reaction at an elevated temperature with ammonium or an alkali metal thiocyanate.

Treatment of the compounds of Formula III wherein $R_3$ is hydrogen, an alkyl group containing from one to four carbon atoms, phenyl, benzyl or benzoyl with the compound $R_1Y$ wherein $R_1$ has the same significance as in Formula I and Y is halogen or hydroxy leads to the isothioureas of Formula I. This reaction is normally carried out on the halogen acid addition salt of the compounds of Formula III and/or in the presence of a halogen acid which, when Y is halogen, will conveniently be of the Formula HY. The reaction will normally be carried out in a suitable solvent such as an alcohol, e.g. ethanol, dimethylformamide or acetone.

Alternatively, the compounds of Formula III may be treated with an unsaturated substance such as acrylonitrile as described in Example 16 hereinafter to yield the corresponding isothiourea within the scope of Formula I.

An alternative method for the production of certain compounds of Formula I from the amines of Formula II involves treatment of the latter with an alkylthio compound for example with 2-methylmercapto-2-thiazoline as described in Example 27 hereinafter.

As stated hereinabove, the isothioureas of the compositions and methods of this invention normallly exist and are produced as addition salts with acids. Such addition salts include those with hydrochloric, hydrobromic, hydriodic, sulphuric, picric and maleic acids and as described in a number of the examples hereinafter, the addition salt with one of these acids may readily be converted to that with another. Such conversion may be effected by means of ion-exchange techniques. A particularly useful method which also in many cases effects purification to a sufficient degree to allow the resultant solution of the addition salt to be used for pharmacological estimations involves the formation of the picrate salt and conversion therefrom to the chloride salt.

The pharmaceutical compositions of this invention to inhibit H-2 histamine receptors comprise a pharmaceutical carrier and an isothiourea compound of Formula I or a pharmaceutically acceptable acid addition salt thereof. The active ingredient will be present in the compositions of this invention in an effective amount to inhibit H-2 histamine receptors.

The method of inhibiting H-2 histamine receptors, according to this invention, comprises administering to an animal in an amount sufficient to inhibit H-2 histamine receptors an isothiourea compound of Formula I or a pharmaceuticallly acceptable acid addition salt thereof. The isothiourea compound is preferably administered in a dosage unit form.

Another object of this invention is a method of inhibiting gastric acid secretion which comprises administering internally to an animal in an amount sufficient to inhibit gastric acid secretion an isothiourea compound of Formula I or a pharmaceutically acceptable acid addition salt thereof.

The compounds of Formula I may be combined with a pharmaceutically acceptable carrier to form pharmaceutical compositions. The pharmaceutical carrier employed may be, for example, either a solid or liquid. Exemplary of solid carriers are lactose, terra alba, sucrose, talc, gelatin, agar, pectin, acacia, magnesium stearate, stearic acid and the like. Exemplary of liquid carriers are syrup, peanut oil, olive oil, together and the like. Other pharmacologically active compounds may in certain cases be included in the pharmaceutical compositions.

As stated above, the isothioureas of Formula I have been found to have pharacological activity in the animal body as antagonists to certain actions of histamine which are not blocked by "antihistamines" such as mepyramine. For example, they have been found to inhibit selectively the histamine-stimulated secretion of gastric acid from the lumen-perfused stomachs of rats anaesthetised with urethane, at doses from 8 to 256 micromoles per kilogram intravenously. This procedure is described in the abovementioned paper of Ash and Schild. Similarly, the action of these compounds may, in many cases, be demonstrated by their antagonism to the effects of histamine on other tissues which, according to the above-mentioned paper of Ash and Schild, are not H-1 receptors. Examples of such tissues are perfused isolated guinea-pig heart, isolated guinea-pig right atrium and isolated rat uterus.

The compounds of the compositions and methods of this invention inhibit the secretion of gastric acid stimulated by pentagastrin or by food. In addition, these compounds also show anti-inflammatory activity in conventional tests such as the rat paw oedema test and u.v. erythema test. In the rat paw oedema test where the oedema is induced by bradykinin the paw volume is reduced by subcutaneous injection of about 500 micromoles/kg. The level of activity found for the compounds used in the method of the present invention is illustrated by the effective dose range in the anesthetized rat, that is from 8 to 256 micromoles per kilogram, given intravenously, and also by the dose effective in the rat paw oedema test.

A wide variety of pharmaceutical forms can be employed. Thus, if a solid carrier is used, the preparation can be tableted, placed in a hard gelatin capsule in powder or pellet form, or in the form of a trocne or lozenge. The amount of solid carrier will vary widely but preferably will be from about 25 mg. to about 1 gm. If a liquid carrier is used, the preparation may be in the form of a syrup, emulsion, soft gelatin capsule, sterile injectable liquid such as an ampoule, or an aqueous or nanaqueous liquid suspension.

The pharmaceutical compositions are prepared by conventional techniques involving procedures such as mixing, granulating and compressing or dissolving the ingredients as appropriate to the desired preparation.

The active ingredient will be present in the composition in an effective amount to inhibit H-2 histamine receptors. The route of administration may be internally, i.e. orally or parenterally, or topically.

Preferably, each dosage unit for internal administration will contain the active ingredient in an amount of from about 100 mg. to about 250 mg. The active ingredient will preferably be administered in equal doses three to six times per day. The daily dosage regimen for internal administration will preferably be from about 750 mg. to about 1000 mg.

For therapeutic use, the pharmacologically active compounds of the methods of the present invention will normally be administered as a pharmaceutical composition comprising as the or an essential active ingredient at least one such compound in the basic form or in the form of an addition salt with a pharmaceutically acceptable acid and in association with a pharmaceutical carrier therefor.

Advantageously the composition will be made up in a dosage form appropriate to the desired mode of administration for example, as a tablet, capsule, injectable solution or, when used as an anti-inflammatory agent, as a cream for topical administration.

The invention is illustrated but in no way limited by the following examples.

EXAMPLE 1

Preparation of
S-methyl-N-[3-(4(5)-imidazolyl)propyl]isothiourea dihydriodide

4(5)-(2-Chloroethyl)imidazole hydrochloride (200 g.) is dissolved in dimethylformamide (60C ml.) and the solution treated with charcoal and filtered. The filtrate is added gradually to a stirred suspension of sodium cyanide (176 g.) in dimethylformamide (2.25 l.) maintained at 130°–135°C. The addition requires 35 minutes and after this time the temperature is maintained at 135°C. for five minutes. After cooling in an ice bath to 10°C., suspended solid is removed by filtration and washed with dimethylformamide. The filtrate is concentrated under reduced pressure and final traces of dimethylformamide are removed with p-xylene (2×200 ml.). The dry residue is dissolved in distilled water (500 ml.) and charged into a one liter extractor (volume including washings now 750 ml.) and extracted continuously with isopropyl acetate. The ectracts are dried over magnesium sulphate, treated with charcoal and concentrated to low bulk. Cooling affords 4(5)-(2-cyanoethyl)imidazole, m.p. 71–74°C. Alternative conditions for the synthesis of 4(5)-(2-cyanoethyl)imidazole are as follows: a solution of 4(5)-(2-chloroethyl)imidazole hydrochloride (136 g.) in water (500 ml.) is added, with stirring, to a solution of sodium cyanide (420 g.) in water (1.65 l.). The resultant mixture is heated at 60°–65°C. for 20 hours. After cooling, the solution is treated with charcoal, filtered and concentrated under reduced pressure. The dry residue is extracted with hot ethyl acetate (5 l.) and the extracts are treated with charcoal and concentrated under reduced pressure, affording 4(5)-(2-cyanoethyl)imidazole, m.p. 70°–71°C. A pure sample of the base, m.p. 71°–73°C., is obtained by recrystallization from isopropyl acetate. A sample of the hydrochloride, m.p. 118°–120°C., is obtained by acidification with dry hydrogen chloride in ether.

A solution of 4(5)-(2-cyanoethyl)imidazole (61 g.) in absolute alcohol (600 ml.) is saturated with gaseous ammonia at −20°C. The resultant solution is hydrogenated over Raney nickel catalyst (approximately 4 g.) at 100 atmospheres pressure for 4 hours at a temperature of 135°–145°C. After cooling, filtration and treatment with charcoal, the solution is concentrated under reduced pressure, affording 4(5)-3-aminopropylimidazole as a low melting solid. For purification, the amine (61 g.) is dissolved in a solution of sodium bicarbonate (82 g.) in water (1.6 l.) and N-carbethoxyphthalimide (122 g.) added over 0.5 hour. After stirring for 1.5 hours, the solid is collected, washed with water and dried. Recrystallization from aqueous ethanol yields 4(5)-(3-phthalimidopropyl)imidazole. A pure sample obtained by further recrystallization from aqueous ethanol has m.p. 160°–162°C.

Hydrolysis 5N hydrochloric acid for 16 hours followed by removal of phthalic acid yields 4(5)-3-aminopropylimidazole dihydrochloride, m.p. 156°–158°C. (from ethanol-ether). Treatment with sodium ethoxide in ethanol yields pure 4(5)-(3-aminopropyl)imidazole.

A solution of benzoyl isothiocyanate (65.2 g.) in chloroform is added slowly to a solution of 4(5)-(3-aminopropyl)-imidazole (50.0 g.) in chloroform (1.5 l.). The resultant solution is heated at reflux temperature for two hours and concentrated under reduced pressure. The residue is dissolved in ethanol and added to an excess of distilled water which results in the precipitation of a white solid. Recrystallization from ethyl acetate yields N-benzoyl-N'-[3-(4(5)-imidazolyl)propyl]-thiourea, m.p. 145°–148°C.

The benzoylthiourea (47 g.) is added, with stirring, to a solution of potassium carbonate (13.8 g.) in water (800 ml.) at 60°–70°C. Subsequent heating at this temperature for one hour gives a clear solution which is treated with charcoal and concentrated to low bulk. Cooling yields N-[3-(4(5)-imidazolyl)-propyl]thiourea, m.p. 149°–150°C., as a colorless solid.

Aqueous hydriodic acid (64/66%, 12 ml.) is added dropwise, with stirring to a cooled suspension of N-[3-(4(5)-imidazolyl)propyl]thiourea (20.0 g.) in absolute ethanol (200 ml.). The addition of excess anhydrous ether precipitates a solid which is filtered off and wahsed with ether affording the hydriodide salt, m.p. 135°–136°C., as a yellow solid.

Methyl iodide (21 g.) is added to a methanolic solution of N-[3-(4(5)-imidazolyl)propyl]thiourea hydriodide [prepared from the base (20.3 g.)]. The solution is heated under reflux for one hour and then concentrated under reduced pressure. Recrystallization of the residue from isopropyl alcohol-ether yields S-methyl-N-[3-(4(5)-imidazolyl)propyl]isothiourea dihydriodide, m.p. 107°–109°C.

EXAMPLE 2

Preparation of
S-ethyl-N-[3-(4(5)-imidazolyl)propyl]isothiourea dihydriodide and sulphate Ethyl iodide (12.5 g.) is added to a solution of N-[3-(4(5)-imidazolyl)propyl]thiourea hydriodide (23.0 g.) in absolute ethanol (250 ml.) containing water (2 ml.). The resultant solution is heated under reflux for four hours and concentrated under reduced pressure. Recrystallization of the residue from ethanol-ether yields S-ethyl-N-[3-(4(5)-imidazolyl)-propyl]isothiourea dihydriodide, m.p. 113°–114°C.

A solution of S-ethyl-N-[3-(4(5)-imidazolyl)propyl]-isothiourea dihydriodide (20 g.) in water is passed down an ion-exchange column (SO₄form, 250 ml.). Following elution with water, the eluate is concentrated uner reduced pressure. Recrystallization of the residue from water-isopropyl alcohol yields S-ethyl-N-[3-(4(5)-imidazolyl)propyl]isothiouronium sulphate, m.p. 184°–186°C.

EXAMPLE 3

Preparation of
S-(n-propyl)-N-[3-(4(5)-imidazolyl)propyl]isothiourea dihydriodide n-Propyl iodide (1.7 g.) is added to a solution of N-[3-(4(5)-imidazolyl)propyl]thiourea dihydriodide (3.11 g.) in n-propyl alcohol (50 ml.) containing water (2 ml.). The resultant solution is heated under reflux for 18 hours and concentrated under reduced pressure. Recrystallization of the residue from n-propyl alcohol-ethyl acetate affords S-(n-propyl)-N-[3-(4(5)-imidazolyl)propyl]isothiourea dihydriodide, m.p. 102°–104°C.

EXAMPLE 4

Preparation of
S-isopropyl-N-[3-(4(5)-imidazolyl)propyl]isothiourea dihydriodide Isopropyl iodide (1.3 g.) is added to a solution of N-[3-(4(5)-imidazolyl)propyl]thiourea hydriodide (2.33 g.) in isopropyl alcohol (30 ml.) containing water (2 ml.). The resultant solution is heated under reflux for 76 hours and concentrated under reduced pressure. Recrystallization of the residue from isopropyl alcohol-ethyl acetate affords S-isopropyl-N-[3-(4(5)-imidazolyl)propyl]isothiourea dihydriodide, m.p. 60°C. (approx.).

EXAMPLE 5

Preparation of
S-(n-butyl)-N-[3-(4(5)-imidazolyl)propyl]isothiourea dihydrobromide Aqueous hydrobromic acid (49%, 3.6 ml.) is added dropwise, with stirring, to a cooled suspension of N-[3-(4(5)-imidazolyl))propyl]thiourea (6.0 g.) in absolute ethanol (200 ml.). The addition of excess anhydrous ether precipitates a solid which is collected and washed with ether affording the hydrobromide salt, m.p. 163°–164°C.

The solution obtained from the addition of n-butyl bromide (1.7 g.) to N-[3-(4(5)-imidazolyl)propyl]thiourea hydrobromide (3.2 g.) in absolute ethanol (25 ml.) containing water (2 ml.) is heated under reflux for 72 hours. Concentration followed by recrystallization from isopropyl alcohol affords S-(n-butyl)-N-[3-(4(5)-imidazolyl)propyl]isothiourea dihydrobromide, m.p. 162°–163°C.

EXAMPLE 6

Preparation of
S-(n-hexyl)-N-[3-(4(5)-imidazolyl)propyl]isothiourea dihydrobromide The solution obtained from the addition of n-hexyl bromide (1.9 g.) to N-[3-(4(5)-imidazolyl)propyl]thiourea hydrobromide (3.0 g.) in absolute ethanol (25 ml.) containing water (1 ml.) is heated under reflux for 20 hours. Concentration followed by recrystallization from isopropyl alcohol-ether affords S-(n-hexyl)-N-[3-(4(5)-imidazolyl)propyl]isothiourea dihydrobromide, m.p. 159°–161°C.

EXAMPLE 7

Preparation of
S-allyl-N-[3-(4(5)-imidazolyl)propyl]isothiourea dihydrobromide

The solution obtained from the addition of allyl bromide (0.97 g.) to N-[3-(4(5)-imidazolyl)propyl]thiourea hydrobromide (2.0 g.) in absolute ethanol (20 ml.) containing water (1 ml.) is heated under reflux for 3.5 hours. Concentration followed by recrystallization from isopropyl alcohol affords S-allyl-N-[3-(4(5)-imidazolyl)propyl]isothiourea dihydrobromide, m.p. 114°–116°C.

EXAMPLE 8

Prepration of
S-propargyl-N-[3-(4(5)-imidazolyl)propyl]isothiourea dihydrobromide The solution obtained from the addition of propargyl bromide (2.4 g.) to N-[3-(4(5)-imidazolyl)propyl]thiourea hydrobromide (5.0 g.) in absolute ethanol (40 ml.) containing water (2.5 ml.) is heated under reflux for 2 hours. Concentration followed by recrystallization S-propargyl-N-[ethanol affords S-proparglyl-N-[3-(4(5)-imidazolyl)propyl]isothiourea dihydrobromide, m.p. 166°–167°C.

EXAMPLE 9

Preparation of
S-benzyl-N-[3-(4(5)-imidazolyl)propyl]isothiourea dihydrobromide

The solution obtained from the addition of benzyl bromide (1.7 g.) to N-[3-(4(5)-imidazolyl)propyl]thiourea hydrobromide (2.7 g.) in ethanol (30 ml.) is heated under reflux for 2.5 hours. Concentration followed by recrystallization from ethanol-isopropyl alcohol affords S-benzyl-N-[3-(4(5)-imidazolyl)propyl]isothiourea dihydrobromide, m.p. 201°–202°C.

EXAMPLE 10

Preparation of
S-(m-hydroxybenzyl)-N-[3-(4(5)-imidazolyl)propyl]-isothiourea dihydrobromide A solution of m-hydroxybenzyl alcohol (0.88 g.) and N-[3-(4(5)-imidazolyl)propyl]thiourea (1.3 g.) in aqueous hydrobromic acid (49 percent, 10 ml.) is heated under reflux for 2.5 hours. Concentration followed by recrystallization from ethanol-isopropyl alcohol affords S-(m-hydroxybenzyl)-N-[3-(4(5)-imidazolyl)propyl]-isothiourea dihydrobromide in two crops: 0.66 g., m.p. 192°–194°C. and 0.53 g., m.p. 191°–192°C.

EXAMPLE 11

Preparation of
S-(p-chlorobenzyl)-N-[3-(4(5)-imidazolyl)propyl]-isothiourea dihydrochloride The solution obtained from the addition of p-chlorobenzyl chloride (1.3 g.) to N-[13-(4(5)-imidazolyl)propyl]thiourea (1.5 g.) in 2n hydrochlorid acid (25 ml.) containing acetone (15 ml.) is heated under reflux for 2.5 hours. Concentration followed by recrystallization from ethanol-isopropyl alcohol affords S-(p-chlorobenzyl)-N-[3-(4(5)-imidazolyl)propyl]isothiourea dihydrochloride, m.p. 217°–219°C.

EXAMPLE 12

Preparation of
S-(2-phenylethyl)-N-[3-(4(5)-imidazolyl)propyl]-
isothiourea dihydrobromide The solution obtained from the addition of 2-phenylethyl bromide (1.6 g.) to N-[3-(4(5)-imidazolyl)propyl]thiourea hydrobromide (2.2 g.) in absolute ethanol (30 ml.) containing water (1ml.) is heated under reflux for 18 hours. Concentration followed by recrystallization from ethanol-isopropyl alcohol affords S-(2-phenylethyl)-N-[3-(4(5)-imidazolyl)-propyl]isothiourea dihydrobromide, m.p. 179°–181°C.

EXAMPLE 13

Preparation of S-(2-phenoxyethyl)-N-[3-(4(5)-imidazolyl)propyl]-isothiourea dihydrobromide The solution obtained from the addition of 2-phenoxyethyl bromide (2.0 g.) to N-[3-(4(5)-imidazolyl)propyl]thiourea hydrobromide (2.6 g.) in absolute ethanol (30 ml.) containing water (1 ml.) is heated under reflux for 48 hours. Concentration followed by recrystallization from isopropyl alcohol-ether affords S-(2-phenoxyethyl)-N-[3-(4(5)-imidazolyl)-propyl]isothiourea dihydrobromide, m.p. 153°–156°C.

EXAMPLE 14

Preparation
)-imidazolyl)-propyl]S-(2-benzhydryloxyethyl)-N-[3-(4(5)-imidazolyl)-Propyl]isothiourea dipicrate The solution obtained from the addition of 2-benzhydryloxyethyl bromide (1.9 g.) to N-[3-(4(5)-imidazolyl)propyl]-thiourea hydrobromide (1.7 g.) in absolute ethanol (25 ml.) containing water (1 ml.) is heated under reflux for 48 hours. Concentration, followed by reprecipitation from ethanol-ether affords a hygroscopic hydrobromide which is converted into the picrate with picric acid. Recrystallization from ethanol affords S-(2-benzhydryloxyethyl)-N-[3-(4(5)-imidazolyl)propyl]isothiourea dipicrate, m.p. 162°–165°C.

EXAMPLE 15

Preparation of
S-[2-(4(5)-imidazolyl)ethyl]-N-[3-(4(5)-imidazolyl)-
propyl]isothiourea trihydrobromide A solution of 4(5)-(2-hydroxyethyl)imidazole (20 g.) in 49 percent aqueous hydrobromic acid (300 ml.) is heated under reflux for 48 hours. Concentration followed by recrystallization from ethanol-ether affords 4(5)-(2-bromoethyl)imidazole hydrobromide, m.p. 149°–150°C.

A solution of 4(5)-(2-bromoethyl)imidazole hydrobromide (2.56 g.) and N-[3-(4(5)-imidazolyl)propyl]thiourea hydrobromide (2.56 g.) in absolute ethanol (45 ml.) is heated under reflux for 24 hours. Following concentration, 49 percent aqueous hydrobromic acid is added and the solution is evaporated to dryness. Precipitation from isopropyl alcohol-ether affords S-[2-(4(5)-imidazolyl)ethyl]-N-[3-(4(5)-imidazolyl)propyl]isothiourea trihydrobromide as a hygrosopic solid, m.p. 95°–100°C. (dec.).

EXAMPLE 16

Preparation of
S-(2-cyanoethyl)-N-[3-(4(5)-imidazolyl)propyl]-
isothiourea dihydrobromide Acrylonitrile (0.42 g.) is added to a solution of N-[3-(4(5)-imidazolyl)propyl]thiourea hydrobromide (2.0 g.) in absolute ethanol (18 ml.) containing water (2 ml.), with cooling and stirring. After addition, the solution is stirred at room temperature for three hours and heated under reflux for one hour. 48 percent Aqueous hydrobromic acid (0.84 ml.) is added and heating is continued under reflux for 48 hours. Additional acrylonitrile (0.5 ml.) is added during this period. Concentration followed by recrystallization from ethanol-isopropyl alcohol affords S-(2-cyanoethyl)-N-[3-(4(5)-imidazolyl)propyl]isothiourea dihydrobromide, m.p. 162°–164°C.

EXAMPLE 17

Preparation of
S-[2-(N,N-dimethylamino)ethyl]-N-[3-(4(5)-
imidazolyl)propyl]isothiourea trihydrobromide A solution of 2-(N,N-dimethylamino)ethanol (0.89 g.) and N-[3-(4(5)-imidazolyl)propyl]thiourea (1.84 g.) in 48 percent aqueous hydrobromic acid (15 ml.) is heated under reflux for 20 hours. Concentration, followed by repeated recrystallization from ethanol-ether, affords the product as a hygroscopic trihydrobromide.

EXAMPLE 18

Preparation of
S-[3(N,N-dimethylamino)propyl]-N-[3-(4(5)-
imidazolyl)propyl]isothiourea trihydrobromide A solution of 3-(N,N-dimethylamino)propanol (1.55 g.) and N-[3-(4(5)-imidazolyl)propyl]thiourea (2.76 g.) in 48 percent aqueous hydrobromic acid (30 ml.) is heated under reflux for 20 hours. Concentration followed by repeated reprecipitation of the residue from ethanol-ether affords the product as the hygroscopic trihydrobromide, m.p. 90°C. (approx.).

EXAMPLE 19

Preparation of
S-(carboxymethyl)-N-[3-(4(5)-imidazolyl)propyl]-
isothiourea dihydrobromide A solution of N-[3-(4(5)-imidazoly)propyl]thiourea hydrobromide (2.0 g.) in dimethylformamide (25 ml.) containing bromoacetic acid (1.05 g.) is maintained at −10°C. for 16 hours. The addition of excess ether precipitates an oil which crystallizes following trituration with cold ethanol, affording S-(carboxymethyl)-N-[3-(4(5)-imidazolyl)propyl]isothiourea dihydrobromide, m.p. 146°–147°C.

EXAMPLE 20

Preparation of
2-[3-(4(5)-imidazolyl)propylamino]thiazolin-4-one
dihydrobromide

A solution of N-[3-(4(5)-imidazolyl)propyl]thiourea hydrobromide (2.65 g.) in dimethylformamide (30 ml.) containing bromoacetic acid (1.39 g.) is maintained at room temperature for 20 hours. The addition of excess ether precipitates an oil which crystallizes following trituration with ethanol. The solid obtained (1.3 g., m.p. 229°–231°C.) is recrystallized from aqueous ethanol, affording 2-]3-(4(5)-imidazolyl)propylamino]thiazolin-4-one dihydrobromide, m.p. 230°–232°C.

EXAMPLE 21

Preparation of
N,S-dimethyl-N'-[3-(4(5)-imidazolyl)propyl]-isothiourea dihydriodide and dihydrochloride Methyl isothiocyanate (3.5 g.) is added slowly to a solution of 4(5)-(3-aminopropyl)imidazole (6.0 g.) in chloroform (50 ml.). The resultant solution is heated under reflux for 1 hour and concentrated under reduced pressure to yield N-methyl-N'-[3-(4(5)-imidazolyl)propyl]thiourea as a semi-solid.

An analytically pure sample is obtained by treatment with hydrogen chloride, recrystallization of the salt from ethanol-ether, followed by treatment with aqueous potassium carbonate. Recrystallization from water yields the pure base, m.p. 135°–137°C.

The crude thiourea (4.8 g.) is converted into its hydriodide salt with 66 percent hydriodic acid (2.7 ml.). This is dissolved in methanol (50 ml.), methyl iodide (3.42 g.) is added and the solution is heated under reflux for 2 hours. Concentration gives an oil which crystallizes in contact with nitromethaneether. Further recrystallization from nitromethane-ether gives pure N,S-dimethyl-N'-[3-(4(5)-imidazolyl)propyl]isothiourea dihydriode, m.p. 143°–145°C.

The crude isothiourea hydriodide salt, prepared as described about from N-methyl-N'-[3-(4(5)-imidazolyl)propyl]-thiourea hydriodide (13 g.) and methyl iodide (8.5 g.) in methanol, is converted into the picrate, m.p. 187°–189°C. Treatment with hydrochloric acid, and removal of picric acid in the normal manner, followed by recrystallization of the product from isopropyl alcohol-hexane yields N,S-dimethyl-N'-[3-(4(5)-imidazolyl)propyl]-isothiourea dihydrochloride, m.p. 194°–196°C.

EXAMPLE 22

Preparation of
S-ethyl-N-methyl-N'-[3-(4(5)-imidazolyl)propyl]-isothiourea dihydriodide Crude N-methyl-N'-[3-(4(5)-imidazolyl)propyl]thiourea hydriodide, prepared as described in Example 21 from 4(5)-(3-aminopropyl)imidazole (6.0 g.), is dissolved in absolute ethanol (100 ml.) containing water (2 ml.). Ethyl iodide (8.75 g.) is added and the solution heated under reflux for 23 hours. Concentration followed by recrystallization from ethanol-etherethyl acetate yields S-ethyl-N-methyl-N'-[3-(4(5)-imidazolyl)propyl]isothiourea dihydriodide, m.p. 134°–135°C.

EXAMPLE 23

Preparation of
N-ethyl-S-methyl-N'-[3-(4(5)-imidazolyl)propyl]-isothiouronium sulphate Ethyl isothiocyanate (4.2 g.) is added slowly to a solution of 4(5)-(3-aminopropyl)imidazole (6.0 g.) in acetonitrile (25 ml.). The resultant solution is heated under reflux for two hours during which time a white solid is deposited. After cooling, the white solid is collected and washed with acentonitrile affording N-ethyl-N'-[3-(4(5)-imidazolyl)propyl]thiourea (8.9 g.), m.p. 145°–148°C.

The thiourea (4.0 g.) is converted into its hydriodide salt and reacted with methyl iodide according to the method described in Example 21. The crude product obtained is converted directly into its sulphate using an ion-exchange resin ($SO_4^{--}$). Recrystallization from ethanol-isopropyl alcohol yields N-ethyl-S-methyl-N'-[3-(4(5)-imidazolyl)propyl]isothiouronium sulphate, m.p. 151°–153°C.

EXAMPLE 24

Preparation of
N,S-diethyl-N'-[3-(4(5)-imidazolyl)propyl]-isothiouronium sulphate N-Ethyl-N'-[3-(4(5)-imidazolyl)propyl]thiourea is caused to react with ethyl iodide by a procedure similar to that described in Example 23, ultimately yielding N,-S-diethyl-N'-[3-(4(5)-imidazolyl)propyl]isothiouronium sulphate.

EXAMPLE 25

Preparation of
N-(n-butyl)-S-methyl-N'-[3-(4(5)-imidazolyl)propyl]-isothiourea dihydrochloride The reaction of n-butyl isothiocyanate (9.2 g.) with 4(5)-(3-aminopropyl)imidazole (10.0 g.) in acetonitrile (50 ml.), according to the method described in Example 23, affords N-(n-butyl)-N'-[3-(4(5)-imidazolyl)propyl]thiourea. An analytically pure sample, m.p. 93°–98°C., is obtained by recrystallization from aqueous isopropyl alcohol.

The thiourea (6.4 g.) is caused to react with excess methyl iodide and the product obtained is subsequently converted to a hydrochloride salt via an intermediate picrate (m.p. 150°–151°C.) by a procedure similar to that described in Example 21. Recrystallization of the final product from ethanol-ether yields N-(n-butyl)-S-methyl-N'-[3-(4(5)-imidazolyl)propyl]isothiourea dihydrochloride, m.p. 152°–155°C.

EXAMPLE 26

Preparation of
S-methyl-N-phenyl-N'-[3-(4(5)-imidazolyl)propyl]-isothiourea dihydriodide The reaction of phenyl isothiocyanate (3.25 g.) with 4(5)-(3-aminopropyl)imidazole (3.0 g.) in acetonitrile (10 ml.) according to the method described in Example 23 affords N-phenyl-N'-[3-(4(5)-imidazolyl)propyl]thiourea.

The thiourea is treated with 66 percent aqueous hydriodic acid (2.4 ml.) in ethanol and the hydriodide salt obtained is caused to react with excess methyl iodide in methanol for 18 hours. Concentration followed by repeated precipitation from isopropyl-alcohol-chloroform-ether leads ultimately to S-methyl-N-phenyl-N'-[3-(4(5)-imidazolyl)propyl]isothiourea dihydriodide, as an extremely hydroscopic solid.

EXAMPLE 27

Preparation of
2-[3-(4(5)-imidazolyl)propyl]amino-2-thiazoline hydriodide

A solution of 2-methylmercapto-2-thiazoline hydriodide (2.6 g.) and 4(5)-(3-aminopropyl)imidazole (1.3 g.) in ethanol (20 ml.) is heated under reflux for 5.5 hours. Concentration, followed by recrystallization from ethanol-methanol affords 2-[3-(4(5)- imidazolyl)propyl]amino-2-thiazoline hydriodide, m.p. 208°–210°C.

EXAMPLE 28

Preparation of S-methyl-N-[4-(5)-imidazolyl)butyl]isothiouronium sulphate

Benzoyl isothiocyanate (7.5 g.) is added dropwise to a solution of 4(5)-(4-aminobutyl)imidazole (4.8 g.) in chloroform (350 ml.) containing a little ethanol (1.6 g.) and the mixture is boiled under reflux for three hours and then concentrated under reduced pressure. The residue is dissolved in hot ethanol and then distilled water is added until an oil begins to precipitate. The mixture, after storing at 0°C. for 16 hours, contains a granular solid which is collected and crystallized from 10 percent ethanol to afford the thiocyanate salt of N-benzoyl-N'-[4-(4(5)-imidazolyl)butyl]thiourea as colorless crystals, m.p. 139°–140°C. Additional material, m.p. 139°–141°C., is obtained from the mother liquors.

N-Benzoyl-N'-[4-(4(5)-imidazolyl)butyl]thiourea hydrothiocyanate (1.5 g.) is added with stirring to 2.5N potassium hydroxide (30 ml.) at 65°–70°C. After 15 minutes the mixture is cooled, acidified with dilute hydrochloric acid, and after 2 hours at 5°C. filtered from the benzoic acid which precipitates. The filtrate is basified with anhydrous potassium carbonate and concentrated to dryness under reduced pressure to yield a residue which is extracted with hot ethanol. The extract is concentrated to 5 ml. and cooled to yield colorless crystals. The latter, after being crystallized from water (9 ml.), furnishes N-[4-(4(5)-imidazolyl)butyl]thiourea, m.p. 166°–167°C.

A solution of N-[4-(4(5)-imidazolyl)butyl]thiourea (0.6 g.) in methanol (10 ml.) containing 55 percent aqueous hydriodic acid (0.4 g.) and methyl iodide (0.94 g.) is heated under reflux for four hours. The mixture is concentrated and the residue is dissolved in water and converted into the sulphate by passage through an ion-exchange resin (SO$_4^{--}$) and elution with water. Concentration and crystallization from ethanol-ether affords S-methyl-N-]4-(4(5)-imidazolyl)butyl]isothiouroniium sulphate, m.p. 199°–201°C. The product is further characterized as its dipicrate, m.p. 195°–196°C.

EXAMPLE 29

Preparation of S-methyl-N-[2-(4(5)-imidazolyl)ethyl]isothiourea dihydriodide A solution of benzoyl isothiocyanate (32.6 g.) in chloroform is added to a solution of histamine (22.2 g.) in chloroform (300 ml.). The resultant solution is heated at reflux temperature for 2 hours and concentrated under reduced pressure. The residue is dissolved in the minimum volume of dimethylformamide and added to an excess of distilled water, which affords N-benzoyl-N'- [2-(4(5)-imidazolyl)ethyl]thiourea, m.p. 159°–160°C. Pure material, m.p. 162°–163.5°C.

The benzoylthiourea (17.45 g.) is dissolved in 2.5N potassium hydroxide (600 ml.) and the solution was heated under reflux for 0.5 hour. After cooling and acidification with hydrochloric acid, followed by removal of benzoic acid by filtration, the filtrate is basified with solid potassium carbonate. Following concentration under reduced pressure, the dry residue is extracted several times with hot absolute alcohol. The combined alcohol extracts are concentrated and the residue recrystallized from the minimum volume of water, yielding N-[2-(4(5)-imidazolyl)ethyl]thiourea, m.p. 170°–173°C. The monohydrochloride had m.p. 100°C. (approx.).

The thiourea (10.0 g.) is converted into its hydriodide salt (m.p. 156°–158°C.) and caused to react with methyl iodide in methanol according to the procedure described in Example 1. Recrystallization from isopropyl alcohol affords S-methyl-N-[2-(4(5)-imidazolyl)ethyl]isothiourea dihydriodide, m.p. 158°–159°C.

EXAMPLE 30

Preparation of S-(2-phenylethyl)-N-[2-(4(5)-imidazolyl)ethyl]-isothiourea dihydrobromide Aqueous hydrobromic acid (49 percent, 0.7 ml.) is added, dropwise, with stirring to a cooled suspension of N-[2-(4(5)-imidazolyl)ethyl]thiourea (0.9 g.) in ethanol. The addition of excess ether precipitates the hydrobromide salt which is redissolved in absolute alcohol (20 ml.) containing water (1 ml.). 2-Phenylethyl bromide (1.0 g.) is added and the resultant solution heated under reflux for 24 hours. Recrystallization of the product from isopropyl alcohol yields S-(2-phenylethyl)-N-[2-(4(5)-imidazolyl)ethyl]isothiourea dihydrobromide, m.p. 170°–171°C.

EXAMPLE 31

Preparation of N,S-dimethyl-N'-[2-(4(5)-imidazolyl)ethyl]isothiourea dihydriodide Methyl isothiocyanate (11 g.) is caused to react with histamine (16.7 g.) in chloroform according to the procedure described in Example 21. N-methyl-N'-[2-(4(5)-imidazolyl)ethyl]-thiourea is isolated as its hydrochloride salt, m.p. 134°–136°C.

The hydriodide salt is prepared from the hydrochloride (4.7 g.) by way of the intermediate base and caused to react with methyl iodide (2.8 g.) in methanol according to the procedure described in Example 21. Recrystallization of the product from ethanol -ether affords N,S-dimethyl-N'-[2-(4(5)-imidazolyl)ethyl]-isothiourea dihydriodide, m.p. 193°–195°C.

EXAMPLE 32

Preparation of S-(2-hydroxyethyl)-N-[3-(4(5)-imidazolyl)propyl]-isothiouronium sulphate The solution obtained from the addition of 2-bromoethanol (1.9 g.) to N-[3-(4(5)-imidazolyl)propyl]thiourea hydrobromide (4.0 g.) in absolute ethanol (35 ml.) containing water (1 ml.) is heated under reflux for 20 hours. Treatment of the crude product with picric acid yields S-(2-hydroxyethyl)-N-[3-(4(5)-imidazolyl)-propyl]isothiouronium dipicrate, m.p. 145°–147°C. The picrate is converted into the corresponding hydrochloride in the normal way using hydrochloric acid. This is finally converted into S-(2-hydroxyethyl)-N-[3-(4(5)-imidazolyl)propyl]isothiouronium sulphate (ion-exchange resin, SO$_4$) which is obtained as a glass.

EXAMPLE 33
Preparation of
S-methyl-N-benzyl-N'-[3-(4(5)-imidazolyl)propyl]-isothiouronium sulphate A solution of 4(5)-(3-aminopropyl)imidazole (1.25 g.) in absolute alcohol (10 ml.) is added slowly, with stirring, to carbon disulphide (20 ml.). An oil forms which gradually crystallizes. After filtration and washing with ether, the solid (1.5 g., m.p. 125°–130°C.) is twice recrystallized from water to give N-[3-(4(5)-imidazolyl)propyl]dithiocarbamic acid, m.p. 130°–134°C.

A solution of this compound (1.0 g.) in methanol (5 ml.) containing methyl iodide (0.71 g.) is stirred at room temperature for one hour. Concentration under reduced pressure followed by the addition of ether yields a cream solid. Recrystallization from ethanol-ether yields S-methyl-N-[3-(4(5)-imidazolyl)propyl]-dithiocarbamate hydriodide, m.p. 112.5°–113.5°C.

This compound (10.4 g.) is added to a stirred mixture of benzylamine (3.2 g.) and potassium carbonate (2.1 g.) in water (30 ml.) and stirring is continued for three hours at reflux temperature. After cooling, water (50 ml.) is added and the mixture is extracted with chloroform (4×200 ml.). Concentration of the dried extracts affords an oil which is recrystallized from ethanol-ether as colorless needles (5.5 g., m.p. m.p. 122°–125°C.). Recrystallization of a portion (2.8 g.) of this solid from ethanolwater yields N-benzyl-N'-[3-(4(5)-imidazolyl)propyl]thiourea, m.p. 126°–127°C.

N-Benzyl-N'-[3-(4(5)-imidazolyl)propyl]thiourea (2.74 g.) is converted into its hydriodide salt and caused to react with methyl iodide (1.41 g.) according to the method described in Example 1. The product obtained is passed down a column of ionexchange resin (SO₄). Final recrystallization from aqueous methanol affords S-methyl-N-benzyl-N'-[3-(4(5)-imidazolyl)propyl]isothiouronium sulphate as the hemihydrate, m.p. 139°–140°C.

EXAMPLE 34
Preparation of
S-benzyl-N-(n-butyl)-N'-[3-(4(5)-imidazolyl)propyl]-isothiouronium sulphate N-(n-Butyl)-N'-[3-(4(5)-imidazolyl)propyl]thiourea (6.2 g.) is converted into its hydrobromide salt and caused to react with benzyl bromide (13.7 g.) according to the method described in Example 25. The product obtained is passed down a column of ion-exchange resin (SO₄). Concentration of the aqueous eluate affords S-benzyl-N-(n-butyl-N'-[3-(4(5)-imidazolyl)propyl]isothiouronium sulphate as a hydroscopic solid.

EXAMPLE 35
Preparation of
S-ethyl-N-[3-(2-pyridyl)propyl]isothiourea dihydriodide and sulphate 2-(2-Cyanoethyl)pyridine is reduced with lithium aluminum hydride in ether, in the normal way, yielding 2-(3-aminopropyl)pyridine, b.p. 77°C./0.4 mm.

2-(3-Aminopropyl)pyridine is reacted with benzoyl isothiocyanate in chloroform by the procedure of Example 1 to given N-benzoyl-N'-[3-(2-pyridyl)propyl]thiourea. Removing the N-benzoyl group by the procedure of Example 1 and reacting the resulting N-[3-(2-pyridyl)propyl]thiourea with ethyl iodide by the procedure of Example 2 gives the products.

EXAMPLE 36
Preparation of
S-methyl-N-[3-(1,2,4-triazolyl)propyl]isothiourea hydriodide The product is prepared according to the procedure of Example 1 from 3-(3-aminopropyl)-1,2,4-triazole.

EXAMPLE 37
Preparation of
S-methyl-N-[3-(3-pyrazolyl)propyl]isothiourea hydriodide Aluminium chloride (43 g.) is added to a stirred solution of 4-phthalimidobutyryl chloride (36.2 g.) in 1,1,2,2-tetrachloroethane (400 ml.), previously saturated with acetylene. Acetylene is bubbled through the solution overnight, with stirring, and the reaction mixture is then decomposed by the addition of crushed ice (300 g.). The organic layer is separated and the aqueous layer extracted with 1,1,2,2-tetrachloroethane (3×100 ml.). The combined organic solution is dried over sodium sulphate and concentrated. The residual solid is recrystallized from hexane affording 1-chloro-6-phthalimidohex-1-en-3-one, m.p. 92°C.

This is immediately caused to react with hydrazine hydrate (19.2 g.) at 95°C. for 10 minutes. Following concentration, the residue is extracted with ether in a Soxhlet apparatus for three days. Concentration of the ether extract affords 3-(3-aminopropyl)pyrazole.

Using 3-(3-aminopropyl)pyrazole in place of 4(5)-(3-aminopropyl)imidazole in the procedure of Example 1 gives S-methyl-N-[3-(3-pyrazolyl)propyl]isothiourea hydriodide.

EXAMPLE 38
Preparation of
S-methyl-N-[3-(2-thiazolyl)propyl]isothiourea hydriodide A mixture of 3-phthalimidothiobutyramide (15.0 g.) and bromacetaldehyde diethyl acetal (19.7 g.) is heated at 100°C. with frequent agitation for 2 hours. The solid mass is extracted with hot ethanol, and the extracts are treated with charcoal and filtered. On cooling crystals are deposited. These are dissolved in water (50 ml.) and the solution washed with ether (25 ml.) and diluted with aqueous sodium acetate to pH 6. A yellowish-brown solid crystallizes out which is collected and washed with water yielding 3-(2-thiazolyl)propylphthalimide hydrobromide, m.p. 67°–70°C. The phthalimido derivative (5.0 g.) is dissolved in ethanol (50 ml.), hydrazine hydrate (2 ml.) is added and the solution heated under reflux for two hours. The solvent is removed under reduced pressure and the residue is dissolved in concentrated hydrochloric acid (30 ml.) and heated under reflux for one hour. After cooling, phthalhydrazide is removed by filtration and the filtrate evaporated to dryness. The residue is recrystallized from methanol-ether yielding 3-(2-thiazolyl)propylamine dihydrochloride, m.p. 160°–165°C.

Using 3(2-thiazolyl)propylamine (prepared from the amine dihydrochloride by reaction with aqueous sodium hydroxide and extraction with ethyl acetate) in place of 4(5)-(3-aminopropyl)-imidazole in the procedure of Example 1 gives S-methyl-N-(3-(2-thiazolyl)-propyl)isothiourea hydriodide.

EXAMPLE 39

Preparation of
S-(p-nitrobenzyl)-N-(3-(4(5)-imidazolyl)propyl)-isothiourea dihydrochloride The product is prepared by the procedure of Example 11 using p-nitrobenzyl chloride in place of p-chlorobenzyl chloride.

EXAMPLE 40

Preparation of
N,S-dimethyl-N'-(5-(4(5)-imidazolyl)pentyl)
isothiouronium sulphate i. A mixture of 1-bromo-7-phthalimidoheptan-2-one (60.0 g.) (obtainable from epsilon amino caproic acid) and formamide (360 ml.) was heated at 180°14 185°C for 2 hours. Following removal of excess formamide by distillation under reduced pressure, the residue was hydrolysed by heating (under reflux) with 5N hydriochloric acid (1.81.) for 18 hours. After cooling to 0° and filtration to remove phthalic acid, the filtrate was concentrated under reduced pressure and the residue extracted with hot ethanol and again concentrated. The residual amine hydrochloride was converted to the free base by passage down Amberlite ion-exchange resin IRA 401 (OH$^-$) and elution with methanol. The base obtained was converted into the picrate with picric acid (82.5 g.) in water. The picrate was recrystallized several times from water affording 4(5)-(5-aminopentyl)-imidazole dipicrate (55 g.), m.p. 209°–211°. An analytically pure sample had m.p. 210°–211° (from nitromethane).

The picrate was treated with hydrochloric acid in the usual way yielding the amine dihydrochloride (24.6 g.) which was finally converted to 4(5)-(5-aminopentyl)imidazole (15.3 g.), m.p. 45–8° by passage down ion-exchange resin Amberlite IRA-401 (OH$^-$). ii.

A solution of methyl isothiocyanate (2.92 g.) and 4(5)-(5-aminopentyl)imidazole (6.13 g.) in acetonitrile (40 ml.) was heated under reflux for 3 hr. Cooling, followed by recrystallization from acetonitrile afforded, N-methyl-(5-(4(5)-imidazolyl)pentyl)thiourea (5.3 g.), m.p. 108°–109°. iii.

The thiourea (2.26 g.) was converted into its hydriodide salt and caused to react with methyl iodide (1.42 g.) according to the method described in Example 21. The product obtained was coverted directly into its sulphate using Amberlite ion-exchange resin IRA 401 (SO$_4^{--}$). Recrystallization from methanol-ether gave N,S-dimethyl-N'-(5-(4(5)-imidazolyl)phenyl) isothiouronium sulphate (2.2 g.), m.p. 220°–221°.

EXAMPLE 41

Preparation of
S-methyl-N-(5-(4(5)-imidazolyl)pentyl)isothiouronium sulphate

Using 4(5)-(5-aminopentyl)imidazole in place of 4(5)-(4-aminobutyl)imidazole in the procedure of Example 28 gives the product.

EXAMPLE 42

| Ingredients | Amounts |
| --- | --- |
| S-ethyl-N-[3-(4(5)-imidazolyl)propyl]-isothiourea dihydriodide | 150 mg. |
| Sucrose | 75 mg. |
| Starch | 25 mg. |
| Talc | 5 mg. |
| Stearic acid | 2 mg. |

The ingredients are screened, mixed and filled into a hard gelatin capsule.

EXAMPLE 43

| Ingredients | Amounts |
| --- | --- |
| S-ethyl-N-[3-(4(5)-imidazolyl)propyl]-isothiouronium sulphate | 150 mg. |
| Lactose | 125 mg. |

The ingredients are screened, mixed and filled into a hard gelatin capsule.

EXAMPLE 44

| Ingredients | Amounts |
| --- | --- |
| S-(2-phenylethyl)-N-[3-(4(5)-imidazolyl)-propyl]isothiourea dihydrobromide | 100 mg. |
| Lactose | 75 mg. |
| Magnesium stearate | 5 mg. |

The ingredients are mixed and filled into a hard gelatin capsule.

EXAMPLE 45

By the procedures of Examples 42–44, capsules containing 150 mg. of S-propargyl-N-[3-(4(5)-imidazolyl)-propyl]isothiourea dihydrobromide and 125 mg. of S-methyl-N-[4-(4(5)-imidazolyl)-butyl]isothiouronium sulphate are prepared.

The capsules prepared as in Examples 42–45 are administered orally to a subject having excessive gastric acid secretion within the dose ranges given hereabove.

What is claimed is:

1. A pharmaceutical composition to inhibit H-2 histamine receptors, said H-2 histamine receptors being those histamine receptors which are not inhibited by mepyramine but are inhibited by burimamide, comprising a, pharmaceutical carrier and, in an effective amount to inhibit said receptors, an isothiourea compound of the formula:

$$A\underset{N}{\underset{|}{\bigcirc}}C-(CH_2)_n-NH-C\underset{SR_1}{\overset{NR_2}{\diagup}}$$

in which:
n is 2 to 5;
A taken together with the carbon and nitrogen atoms shown forms an imidazolyl, pyridyl, 1,2,4-triazolyl, pyrazolyl or thiazolyl ring;

R₁ is an alkyl group having 1 to 6 carbon atoms, an alkenyl or alkynyl group having 2 to 6 carbon atoms or $(CH_2)_m Z$ where m is 1 to 3 and Z is phenyl optionally monosubstituted by halogen, hydroxy or nitro; hydroxy; di-lower alkylamino; cyano; carboxy; phenoxy; benzhydryloxy or imidazolyl and R₂ is hydrogen, alkyl having 1 to 4 carbon atoms, phenyl or benzyl or R₁ and R₂ together with the carbon atoms to which they are attached may form a thiazoline or thiazolin-4-one ring or a pharmaceutically acceptable acid addition salt thereof.

2. A pharmaceutical composition according to claim 1 in which A is such that it forms with the carbon and nitrogen atoms shown a 4(5)-imidazolyl ring.

3. A pharmaceutical composition according to claim 1 in which the isothiourea compound is S-ethyl-N-[3-(4(5)-imidazolyl)propyl]isothiourea dihydriodide.

4. A pharmaceutical composition according to claim 1 in which the isothiourea compound is S-ethyl-N-[3-(4(5)-imidazolyl)propyl]isothiouronium sulphate.

5. A pharmaceutical composition according to claim 1 in which the isothiourea compound is S-(2-phenethyl)-N-[3-(4(5)-imidazolyl)propyl]isothiourea dihydrobromide.

6. A pharmaceutical composition according to claim 1 in which the isothiourea compound is S-propargyl-N-[3-(4(5)-imidazolyl)propyl]isothiourea dihydrobromide.

7. A pharmaceutical composition according to claim 1 in which the isothiourea compound is S-methyl-N-[4-(4(5)-imidazolyl)butyl]isothiouronium sulphate.

8. A method of inhibiting H-2 histamine receptors, said H-2 histamine receptors being those histamine receptors which are not inhibited by mepyramine but are inhibited by burimamide, which comprises administering to an animal requiring said inhibition in an amount sufficient to inhibit H-2 histamine receptors an isothiourea compounds of the formula:

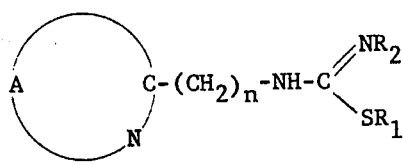

in which:
n is 2 to 5;
A taken together with the carbon and nitrogen atoms shown forms an imidazolyl, pyridyl, 1,2,4-triazolyl, pyrazolyl or thiazolyl ring;
R₁ is an alkyl group having 1 to 6 carbon atoms, an alkenyl or alkynyl group having 2 to 6 carbon atoms or $(CH_2)_m Z$ where m is 1 to 3 and Z is phenyl optionally monosubstituted by halogen, hydroxy or nitro; hydroxy; di-lower alkylamino; cyano; carboxy; phenoxy; benzhydryloxy or imidazolyl and
R₂ is hydrogen alkyl having 1 to 4 carbon atoms, phenyl or benzyl or R₁ and R₂ togehter with the carbon atoms to which they are attached may form a thiazoline or thiazoline-4-one ring
or pharmaceutically acceptable said addition salt thereof.

9. A method according to claim 8 in which A is such that is forms with the carbon and nitrogen atoms shown a 4(5)-imidazolyl ring.

10. A method of inhibiting gastirc acid secretion which comprises administering internally to an animal in need of inhibition of gastric acid secretion in an amount sufficient to inhibit gastric acid secretion an isothiourea compound of the formula:

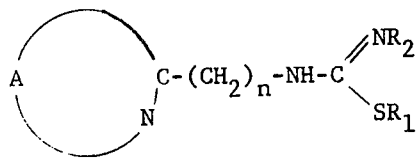

in which:
n is 2 to 5;
A taken together with the carbon and nitrogen atoms shown forms an imidazolyl, pyridyl, 1,2,4-triazolyl, pyrazolyl or thiazolyl ring;
R₁ is an alkyl group having 1 to 6 carbon atoms, an alkenyl or alkynyl group having 2 to 6 carbon atoms or $(CH_2)mZ$ where m is 1 to 3 and Z is phenyl optionally monosubstituted by halogen, hydroxy or nitro; hydroxy; di-lower alkylamino; cyano; carboxy; phenoxy; benzhydryloxy or imidazolyl and
R₂ is hydrogen, alkyl having 1 to 4 carbon atoms, phenyl or benzyl or R₁ and R₂ together with the carbon atoms to which they are attached may form a thiazoline or thiazolin-4-one ring
or a pharmaceutically acceptable acid addition salt thereof.

11. A method of producing anti-inflammatory activity which comprises administering to an animal in need of said activity in an amount sufficient to produce said activity an isothiourea compound of the formula:

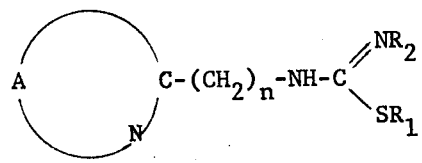

in which
n is 2 to 5;
A taken together with the carbon and nitrogen atoms shown forms an imidazolyl, pyridyl, 1,2,4-triazolyl, pyrazolyl or thiazolyl ring;
R₁ is an alkyl group having 1 to 6 carbon atoms, an alkenyl or alkynyl group having 2 to 6 carbon atoms or $(CH_2)_m Z$ where m is 1 to 3 and Z is phenyl optionally monosubstituted by halogen, hydroxy or nitro; hydroxy; di-lower alkylamino; cyano; carboxy; phenoxy; benzhydryloxy or imidazolyl and
R₂ is hydrogen, alkyl having 1 to 4 carbon atoms, phenyl or benzyl or R₁ and R₂ together with the carbon atoms to which they are attached may form a thiazoline or thiazolin-4-one ring
or a pharmaceutically acceptable acid addition salt thereof.

* * * * *

UNITED STATES PATENT AND TRADEMARK OFFICE
CERTIFICATE OF CORRECTION

PATENT NO. : 3,881,015
DATED : April 29, 1975
INVENTOR(S) : James Whyte Black, Graham John Durant,
John Colin Emmett and Charon Robin Ganellin It is certified that error appears in the above-identified patent and that said Letters Patent are hereby corrected as shown below:

On the first page of the patent, in the left-hand column, in [73] Assignee, "Hartfordshire" should read -- Hertfordshire -- .

Column 1, lines 60-65, should read as follows

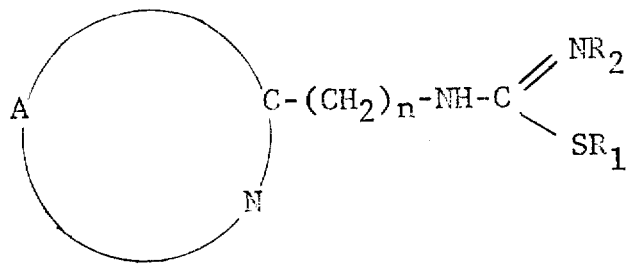

Column 2, line 48, "(n-2)" should read -- (n=2) -- .

Column 2, line 50, "n-3" should read -- n=3 -- .

Column 2, line 52, "n-4" should read -- n=4 -- .

Column 2, line 53, "n-5" should read -- n=5 -- .

Column 2, line 58, before "leads" insert -- or benzoyl -- .

Column 3, line 7, "compounds" should read -- compounds -- .

Column 3, line 11, "be" should read -- by -- .

Column 4, line 10, delete "together" and insert -- water --

UNITED STATES PATENT AND TRADEMARK OFFICE
CERTIFICATE OF CORRECTION

PATENT NO. : 3,881,015
DATED : April 29, 1975
INVENTOR(S) : James Whyte Black, Graham John Durant,
John Colin Emmett and Charon Robin Ganellin It is certified that error appears in the above-identified patent and that said Letters Patent are hereby corrected as shown below:

Column 4, line 48, "trocne" should read -- troche -- .

Column 5, line 24, "(60C ml.)" should read -- (600 ml.) -- .

Column 6, line 64, "uner" should read -- under -- .

Column 8, line 24, after "recrystallization" insert -- from ethanol affords -- .

Column 8, line 62, "[13-" should read -- [3- -- .

Column 8, line 63, "2n hydrochlorid" should read -- 2N hydrochloric -- .

Column 9, lines 30-32, should read -- Preparation of S-(2-benzhydryloxyethyl)-N-[3-(4(5)-imidazolyl)propyl]isothiourea dipicrate -- .

Column 11, line 1, "2-]3-" should read -- 2-[3- -- .

Column 11, line 31, "about" should read -- above -- .

Column 12, line 6, "-N-'-" should read -- -N'- -- .

Column 12, line 57, "hydroscopic" should read -- hygroscopic -- .

Column 13, line 43, "N-]4-" should read -- N-[4- -- .

Column 15, line 65, "given" should read -- give -- .

UNITED STATES PATENT AND TRADEMARK OFFICE
CERTIFICATE OF CORRECTION

PATENT NO. : 3,881,015

DATED : April 29, 1975

Page 3

INVENTOR(S) : James Whyte Black, Graham John Durant, John Colin Emmett and Charon Robin Ganellin It is certified that error appears in the above-identified patent and that said Letters Patent are hereby corrected as shown below:

Column 17, line 20, "180°14 185°C" should read -- 180-185°C -- .

Column 17, line 23, "hydrio-" should read -- hydro- -- .

Column 19, line 67, after "or" and before "pharmaceutically" insert -- a -- .

Column 20, line 2, "is" should read -- it -- .

Column 20, line 4, "gastirc" should read -- gastric -- .

Signed and Sealed this fourteenth Day of October 1975

[SEAL]

Attest:

RUTH C. MASON
*Attesting Officer*

C. MARSHALL DANN
*Commissioner of Patents and Trademarks*

UNITED STATES PATENT AND TRADEMARK OFFICE
CERTIFICATE OF CORRECTION

PATENT NO. : 3,881,015
DATED : April 29, 1975
INVENTOR(S) : James Whyte Black, Graham John Durant, John Colin Emmett and Charon Robin Ganellin It is certified that error appears in the above-identified patent and that said Letters Patent are hereby corrected as shown below:

On the first page of the patent, in the left-hand column, following item [63] insert the following:

[30] Foreign Application Priority Data

October 29, 1969     United Kingdom 52891/69

Signed and Sealed this

*third* Day of *February 1976*

[SEAL]

*Attest:*

RUTH C. MASON
*Attesting Officer*

C. MARSHALL DANN
*Commissioner of Patents and Trademarks*